J. VAALER.

TYPE WRITER DESK.

APPLICATION FILED FEB. 13, 1914

Reissued Nov. 24, 1914.

13,832.

3 SHEETS—SHEET 1.

Witnesses:
Harry S. Gaither
Sebastian Hunter

Inventor:
Jens Vaaler
by Walloce R Lane
Atty

J. VAALER.

TYPE WRITER DESK.

APPLICATION FILED FEB. 13, 1914.

Reissued Nov. 24, 1914. 13,832.

3 SHEETS—SHEET 2.

Witnesses:
Harry S. Gaither
Sebastian Hunter

Inventor:
Jens Vaaler
by
Wallace R. Lane
Att'y

J. VAALER.
TYPE WRITER DESK.
APPLICATION FILED FEB. 13, 1914.
Reissued Nov. 24, 1914.
13,832.
3 SHEETS—SHEET 3.
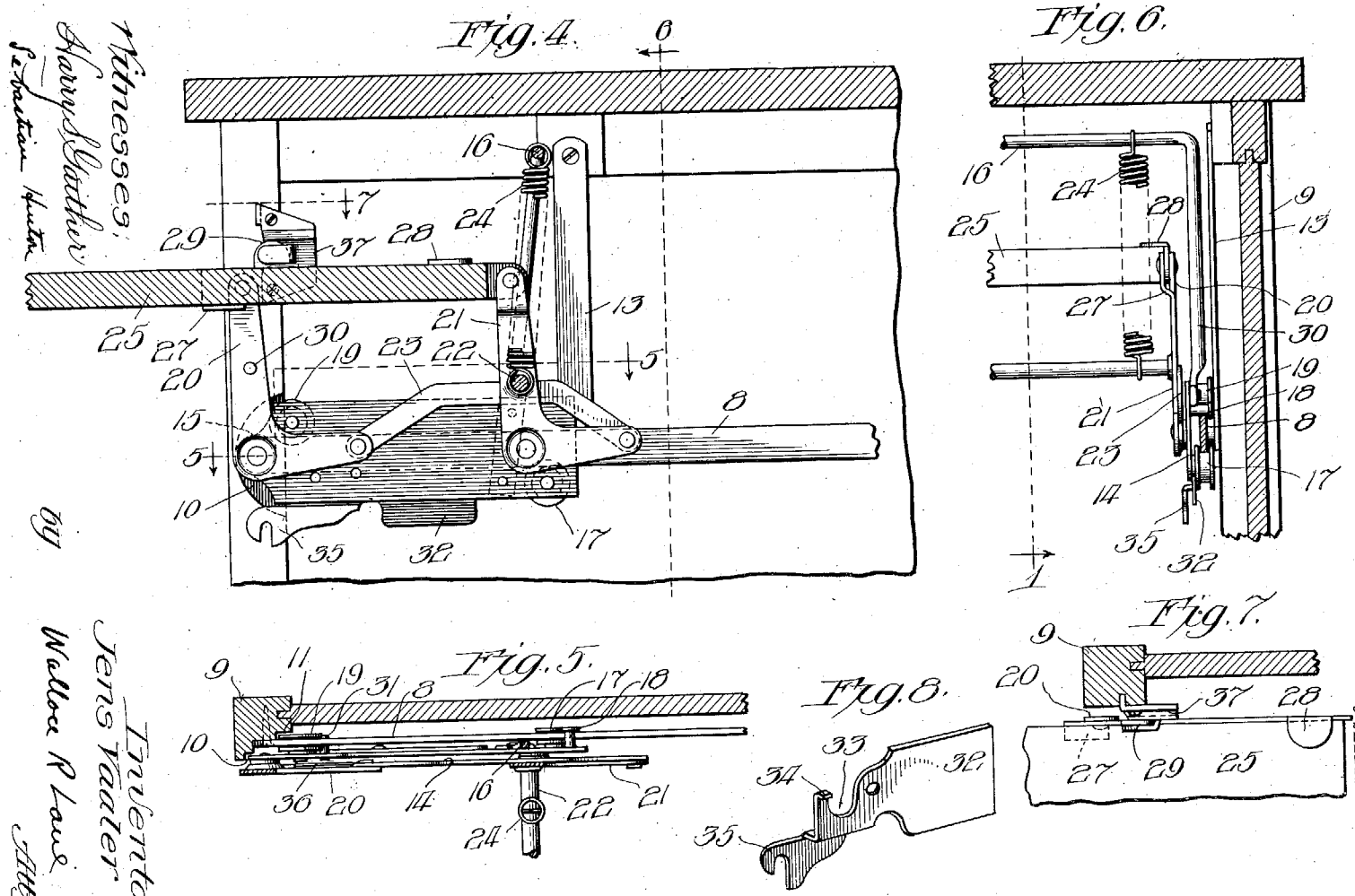
Witnesses:
Harry S. Gaither
Sebastian Hunter
Inventor
Jens Vaaler
by Walloce R Lane
Atty

UNITED STATES PATENT OFFICE.

JENS VAALER, OF CHICAGO, ILLINOIS, ASSIGNOR TO THE CLEMETSEN COMPANY, OF CHICAGO, ILLINOIS, A CORPORATION OF ILLINOIS.

TYPE-WRITER DESK.

13,832. Specification of Reissued Letters Patent. Reissued Nov. 24, 1914.

Original No. 1,035,664, dated August 13, 1912, Serial No. 696,592. Application for reissue filed February 13, 1914. Serial No. 818,609.

*To all whom it may concern:*

Be it known that I, JENS VAALER, a citizen of the United States, residing at Chicago, in the county of Cook and State of Illinois, have invented a new and useful Improvement in Type-Writer Desks, of which the following is a specification.

My present invention is an improvement in the mechanism of United States Letters Patent No. 934,861, granted to me September 21, 1909; and it relates, particularly, to improvement in the locking means for securing the carriage in its advance position preparatory to raising the type-writer platform and against rearward displacement by such raising; the object being to simplify the construction of the locking means and improve the operation thereof in automatically locking the carriage in the position stated and releasing it by lowering the platform to the position from which it is moved backwardly into the housing.

Figure 1:
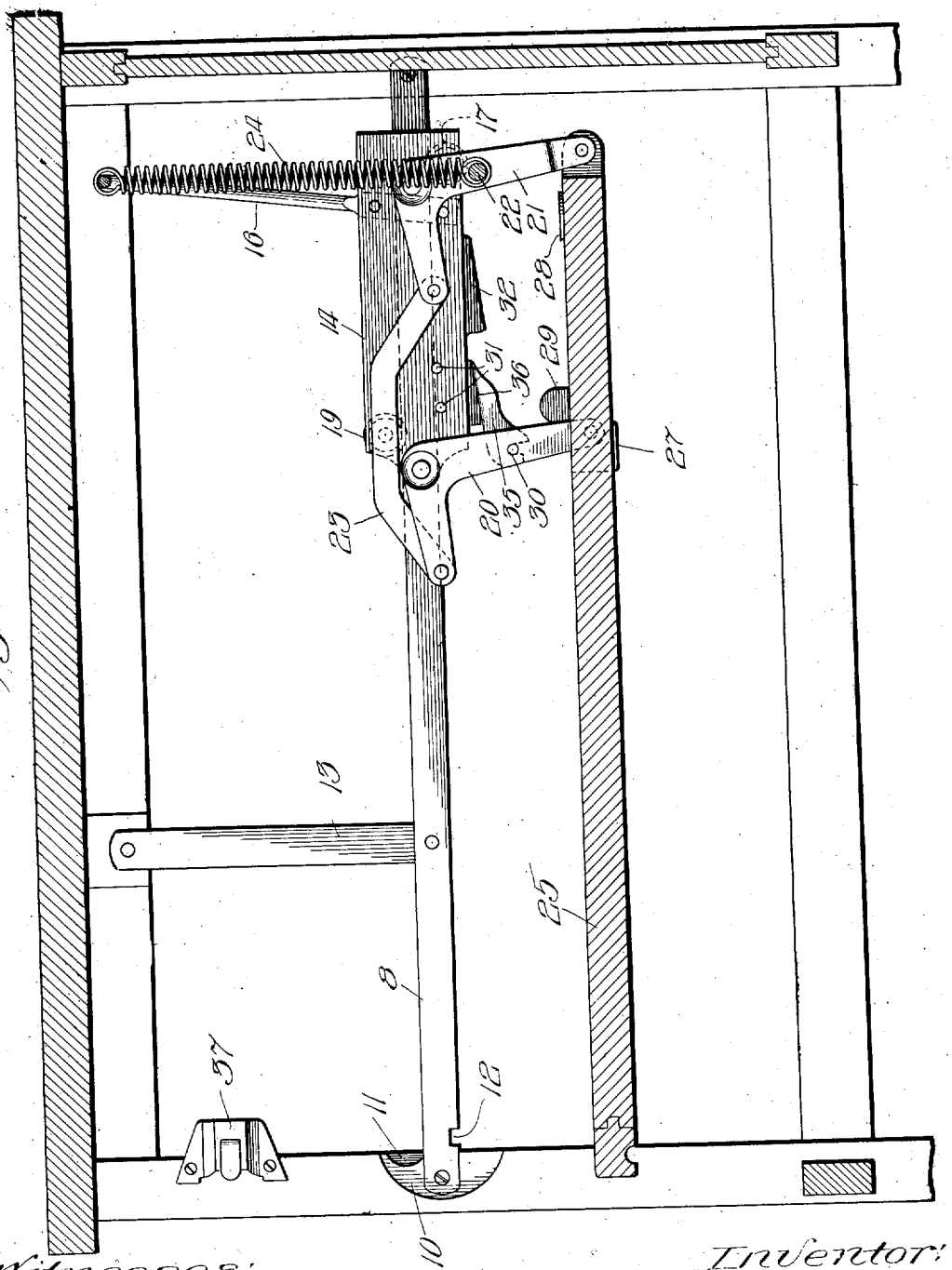
Figure 2:
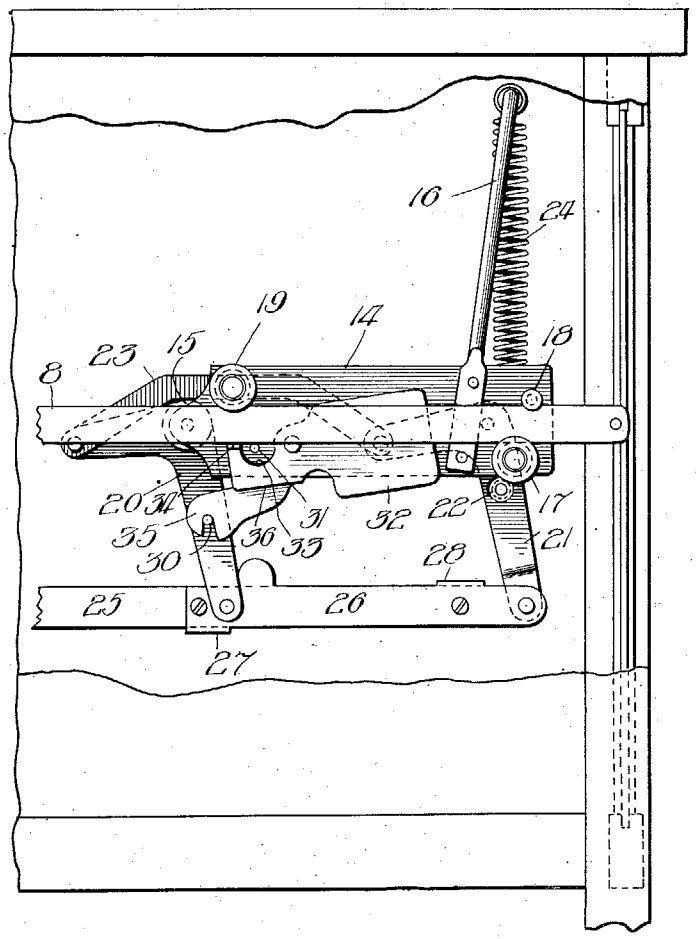
Figure 5:
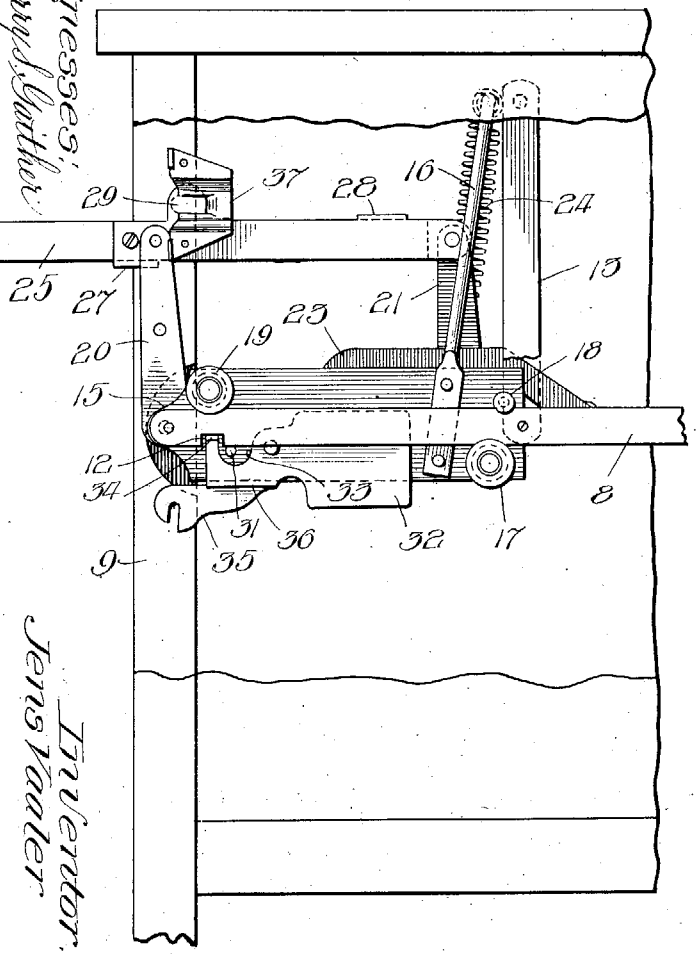

In the accompanying drawings, Figure 1 is a view in sectional elevation of a desk-pedestal equipped with the mechanism of said patent in its improved form, the section being taken on line 1, Fig. 6; Fig. 2 is a side view of the said pedestal with a wall broken away to show the mechanism within it in elevation in the position of the parts represented in Fig. 1, namely with the platform in its lowered and housed position; Fig. 3 is a similar view showing the platform in its withdrawn and raised position; Fig. 4 is a section on line 1, Fig. 6, like Fig. 1, but broken and showing the position of the parts when the platform has been withdrawn and raised; Figs. 5, 6 and 7 are broken sections taken, respectively, on lines 5, 6 and 7, Fig. 4, and Fig. 8 is a perspective view of the locking-lever device.

While, as stated in the aforesaid patent, the invention is not only applicable to a desk-typewriter but is equally applicable to other devices adapted to be used in connection with and housed within a cabinet, pedestal or the like, the following description is confined to the mechanism in the pedestal of a desk.

Corresponding rails 8, 8, forming a carriage-track, are secured to the inner faces of the opposite sides of a desk-pedestal, and are fastened at their outer ends to the front posts 9 of the pedestal at circular recesses 10 in their rear faces, each shown to be provided with an offset 11 at its inner upper portion; and immediately adjacent to the rear face of each front post the rail thus fastened thereto is provided in its lower edge with a notch 12 forming a catch for the purpose hereinafter explained. The rails are additionally supported, between their ends, by hanger-bars 13.

The carriage is a pair of similar metal plates 14, 14, of general rectangular shape, each terminating at its forward end in a nose 15, these plates being rigidly connected near their rear ends by a rod 16 bent into yoke-shape, each plate carrying on the outer face of its rear lower corner a peripherally-grooved guide-wheel 17, above which and to one side of its center projects a headed stud 18; and a similar guide-wheel 19 is journaled on the diagonally-opposite corner of each carriage-plate. The carriage is confined on the track to ride thereon by embracing each rail 8 between the grooved wheels on a plate or side, the stud 18 on the latter preventing the carriage from leaving the track. Similar bell-cranks 20, 20 are journaled at their angles to the noses 15 of the two carriage-plates at their inner faces, and other bell-cranks 21, like the forward ones, are journaled at their angles to the inner faces of the plates near their rear ends, in horizontal alinement with the journals of the forward bell-cranks; and the longer arms of the bell-cranks 21 are connected between their ends by a cross-rod 22, the members 20 and 21 of each pair of the bell-cranks being pivotally connected at the ends of their shorter arms by a bent link 23. Spiral springs, 24, 24 connect the cross-member of the rod 16, near its ends, with the rod 22. The platform 25 is firmly secured at its edges to bars 26, each pivotally connecting the members of a pair of the bell-cranks 20, 21 at the ends of their longer arms, these bars being provided with short inwardly-projecting flanges or ledges 27 on the lower edges of their forward ends and with similarly-projecting flanges 28 on the upper edges of their rear portions, to embrace and reinforce the platform; and from the upper edge of each bar, near its forward end, projects a tongue 29 for the purpose hereinafter stated.

As thus far described the mechanism differs only in minor details from that shown in the aforesaid patent, except as to the notches 12, which perform an important function presently to be described.

On the outer face of the longer arm of each bell-crank 20, and about midway between its ends, projects a stud 30, and a stud 31 projects from the outer face of each carriage-side, or plate 14, to which latter is fulcrumed between its ends a lever 32 of the preferred shape best shown in Fig. 8, having an expanded and relatively heavy rear-end portion, a recess 33 in the upper edge of its forward-portion to clear the stud 31, a tongue or pawl 34 adjacent to the recess to enter a notch 12, and a latch 35 to engage a stud 30, this latch extending from a section of the lever 32 bent, at 36, to offset or shoulder it at its lower-edge portion and thereby extend it across the lower edge of the adjacent carriage-side and thus to cause the latch to project at the inner face of that side into the path of a stud 30. The stud 31 serves the same purpose at the forward end of a carriage-side that the stop 18 serves at the inner end thereof.

The manner of working the typewriter-platform 25, to lower it from its raised and advanced position and introduce it into the pedestal, and to withdraw, raise and advance it from its housed position, is substantially the same as clearly described in said patent. When the platform is in its lowermost and housed position, shown in Figs. 1 and 2, the studs 30 are engaged by the latches 35 to lock the bell-cranks against turning, the obstruction which the rails 8 present to the pawls 34 preventing the levers 32 from turning by gravity to withdraw the latches from the studs. When the platform is pulled outwardly in the horizontal direction, the forward wheels 19 abut against the posts 9 at the offsets 11, which they enter, admitting the noses 15 into the recesses at 10. The working of the parts is so timed that in this extreme advanced position of the carriage, whence the raising of the platform begins, the pawls 34, register with and are raised by the dropping of the rear lever-ends whereby the latches 35 are lifted off the studs 30, enter the notches 12 and thus lock the carriage to the rails to prevent the strain in raising the platform from rolling the carriage backwardly on the track, which would tend to disorganize the operation. With the platform raised to the projecting position shown in Fig. 3 the ears 29 enter keepers 37 provided in proper position to receive them on the inner faces of the forward pedestal-posts, and thus supplement the support of the platform by the bell-cranks.

To house the platform from its position represented in Fig. 3, it is pulled outwardly far enough to release the ears 29, and then lowered in its continual horizontal condition, to the point from which the carriage may be run backwardly on its track into the pedestal and be locked by engagement of the latches 35 with the studs 30. In lowering the platform the studs 30, (see Fig. 4) when swung about the pivot point of forward bell cranks 20, will obviously first strike the backs of the notches of the forward ends of the latches 35 knocking these latches down to pull lugs 34 out of engagement with the notches in the rails, thus freeing the carriages for backward movement.

I claim:—

1. In combination, a desk, a cabinet, or the like, housing a carriage track and a carriage movable thereon and carrying bell-cranks link-connected in pairs, with a platform pivotally supported on the longer bell crank arms, a catch on the track, a stud on one of said arms, and a lever fulcrumed between its ends on a side of said carriage to tend to drop by gravity at its inner end and provided with a pawl to engage said catch and lock the carriage in its advance position, and a latch to engage said stud for locking the bell-cranks against turning in the movements of the carriage.

2. In combination, a desk, a cabinet, or the like, housing a carriage track and carriage movable thereon and carrying bell-crank levers link connected in pairs, with a platform pivotally supported on the longer bell-crank arms, catches on the track-rails near their forward ends, studs on said arms, levers fulcrumed to the carriage side to tend to drop by gravity at their inner ends and provided with forward pawls to engage said catches and lock the carriage in its advance position and latches forward of the pawls to engage said studs for locking the bell-cranks against turning in the movement of the carriage.

3. In combination, a desk, a cabinet, or the like, housing a carriage track, and a carriage movable thereon and carrying bell-cranks, link connected in pairs, with a platform pivotally supported on the longer bell crank-arm, notches in the lower edges of the track-rails near their forward ends, studs on said arms, levers fulcrumed to the outer faces of the carriage sides to tend to drop by gravity at their inner ends and provided with forward pawls to enter said notches and lock the carriage in its advance-position, said levers having shoulders toward their forward ends crossing the lower edges of said sides, and latches forward of the shoulders to engage said studs for locking the bell-cranks against turning in the movements of the carriage.

4. In combination, a desk, a platform mounted therein and adapted to be moved outwardly then upwardly, means automatically operated for holding said platform against inward movement while it is being raised, a keeper secured to said desk, a lug on said platform and adapted to engage said keeper for holding said platform against lateral movement after it has reached its raised position.

5. In combination, a desk, a platform mounted therein and adapted to be moved outwardly then upwardly, a lug on said platform near the inner end thereof and adapted to engage a keeper secured to said desk to prevent lateral movement of said platform after it has reached its raised position.

6. In combination, a desk, a platform support, a platform mounted thereon and adapted to be moved outwardly and then upwardly, a parallel link motion for raising said platform when at its outer limit of motion, a rocking gravity latch pivoted upon said platform support and adapted to drop into position as the platform rises upward to restrain the latter from inward movement, said latch being so constructed and located as to be lifted by one of said links as the platform reaches its lowermost position, no other mechanism than the said link being necessary for the operation of said latch.

7. In apparatus of the class described, a platform support, a platform, a plurality of substantially parallel levers for raising said platform and so arranged that the platform is at all times maintained thereby in a horizontal position, means acting on the rear part of said levers at points on the opposite sides of the pivots from the platform to facilitate the raising operation, together with a gravity latch having a lug adapted to drop into engagement with a shoulder upon one of the elements above enumerated, as the platform starts its upward movement, and to be released by one of the forward levers as the platform reaches its lowermost position whereby the platform is restrained against inward movement while being raised and lowered, said latch being operated solely by gravity and by direct engagement with one of the links.

8. In combination, a desk, a support, a platform mounted thereon and adapted to be moved outwardly then upwardly, two pairs of parallel levers adapted to support said platform at all times in a horizontal position, a gravity latch having a lug thereon for engaging with one of the parts above enumerated, said latch being adapted to drop into engagement with said part as the platform starts upward to restrain the latter from inward movement, and being adapted to be unlatched by one of said levers as the platform again assumes its lowermost position.

9. In apparatus of the class described, a desk, a platform mounted therein and adapted to be moved outwardly then upwardly, a gravity latch adapted to move into position to prevent inward movement of the platform while the latter is being raised or lowered, a keeper on the desk, a lug adjacent the inner end of the platform and adapted to engage said keeper to positively lock the platform against lateral movement in position for use when the platform is moved slightly inwardly at the upper limit of its movement, said latch being so constructed and arranged as to permit such inward movement of the platform at its uppermost position.

10. In apparatus of the class described, a desk, a platform mounted therein and adapted to be moved outwardly then upwardly, a parallel lever motion connected to said platform to maintain it at all times in horizontal position, a keeper on the desk, means acting on said lever motion to assist in raising the platform, a lug on the inner end of the platform adapted to be moved into engagement with the keeper by backward movement of the platform when the latter has reached the upper limit of its movement whereby the platform, in position for use must first be drawn forward before it can be lowered.

11. In apparatus of the class described, a track, a carriage, levers pivoted in said carriage and including a bell crank lever, a platform supported by said levers and maintained at all times in horizontal position thereby, a gravity latch mounted in said carriage and adapted to lock said carriage to said track as the platform starts upward and to be released by one arm of the bell crank lever as the platform reaches its lowermost position, in combination with means engaging the same bell crank lever arm to lock the platform in lowermost position.

In witness whereof, I hereunto subscribe my name to this specification in the presence of two witnesses.

JENS VAALER.

Witnesses:
JULIUS CLEMETSEN,
ABRAHAM B. GREENBERG.